United States Patent

Kogelschatz et al.

Patent Number: 5,194,740
Date of Patent: Mar. 16, 1993

[54] IRRADIATION DEVICE

[75] Inventors: Ulrich Kogelschatz, Hausen; Christoph von Arx, Olten, both of Switzerland

[73] Assignee: Asea Brown Boveri Ltd., Baden, Switzerland

[21] Appl. No.: 859,912

[22] Filed: Mar. 30, 1992

[30] Foreign Application Priority Data

Apr. 15, 1991 [EP] European Pat. Off. ........ 91106025.9

[51] Int. Cl.$^5$ ............................. G21K 5/08; H01J 37/00
[52] U.S. Cl. ............................. 250/492.1; 250/455.11; 250/504 R; 250/432 R; 250/436; 315/248
[58] Field of Search .......... 250/492.1, 455.11, 504 R, 250/432 R, 436; 315/248

[56] References Cited

U.S. PATENT DOCUMENTS

| | | | |
|---|---|---|---|
| 2,189,279 | 2/1940 | Bitner | 315/248 |
| 2,339,906 | 1/1944 | Barnes | 250/504 R |
| 3,049,488 | 8/1962 | Jackson et al. | 315/248 |
| 3,987,306 | 10/1976 | Simpson | 250/492.1 |
| 4,101,424 | 7/1978 | Schooley et al. | 250/492.1 |
| 4,266,166 | 5/1981 | Proud et al. | 315/248 |
| 4,336,456 | 6/1982 | Kuse et al. | 250/504 R |
| 5,013,959 | 5/1991 | Kogelschatz | 315/248 |

FOREIGN PATENT DOCUMENTS 4022279 2/1991 Fed. Rep. of Germany .

OTHER PUBLICATIONS

10th Lecture Conference of the Society of German Chemists, Photochemistry Group, Nov. 18-20, 1987, pp. 23-25, U. Kogelschatz et al., "New UV and VUV Excimer Radiators".

Primary Examiner—Jack I. Berman
Assistant Examiner—Kiet T. Nguyen
Attorney, Agent, or Firm—Oblon, Spivak, McClelland, Maier & Neustadt

[57] ABSTRACT

The irradiation device for gaseous or liquid substances has at least one high-power radiator with a discharge chamber (4) filled with filling gas. The filling gas contained therein emits radiation under the influence of quiet electrical discharges. The discharge chamber (4) immediately adjoins a treatment chamber (6) whose walls consist throughout of non-metallic material. An electrode pair (2, 7) and an ac source (12) connected to the two electrodes serve to feed the discharge, the coupling of the discharge chamber (4) to the electrodes being performed essentially capacitively. It is even possible, in particular, to treat by means of an irradiation device of such a design corrosive media or media for which extreme degrees of purity are the aim.

8 Claims, 1 Drawing Sheet

IRRADIATION DEVICE

BACKGROUND OF THE INVENTION

1. Field of the Invention

The invention relates to an irradiation device for electrically non-conducting or only poorly conducting substances. It relates, in particular, to such a device having at least one high-power radiator, preferably an excimer radiator with a discharge chamber filled with filling gas, the filling gas emitting radiation, preferably excimer radiation, under the influence of quiet electrical discharges, the discharge chamber being bounded by walls, at least one wall consisting of dielectric material and being transparent to the radiation generated in the discharge chamber, having an electrode pair outside the discharge chamber, a treatment chamber immediately adjoining one of the walls of the discharge chamber, and having an ac source, connected to the two electrodes, for feeding the discharge, the coupling of the electrical energy into the discharge chamber being performed essentially capacitively by the substance to be treated in the treatment chamber.

In this regard, the invention refers to DE-A1 40 22 279.

2. Discussion of Background

UV and VUV high-power radiators of the type mentioned at the beginning were first presented to the public in the lecture by U. Kogelschatz entitled "Neue UV- und VUV-Excimerstrahler" ("New UV and VUV Excimer Radiators") at the 10th Lecture Conference of the Society of German Chemists, Photochemistry Group, Würzburg 18th–20th November 1987. Said high-power radiator can be operated with high electrical power densities (1–50 KW/m$^2$) and high efficiency. Within wide limits, its geometry can be adapted to the process in which it is used. The German Offenlegungsschrift mentioned at the beginning conveys an idea of irradiation devices having such radiators. It is characteristic in this regard that the treatment chamber or chambers is/are bounded at least partially by metallic electrodes. However, in many applications it can be advantageous if no metallic surface is in contact with the medium to be treated. This applies in particular to corrosive media, or when it is necessary to aim for extreme degrees of purity (ultra-pure water engineering, pharmaceutical industry).

SUMMARY OF THE INVENTION

Accordingly, one object of this invention is to provide a novel irradiation device which enables the direct action of the radiation on substances and mixtures of substances of all types.

This object is achieved according to the invention when the treatment chamber is sealed on all sides by walls made from non-metallic material or from material coated completely with non-metallic material.

Renouncing metallic parts in the treatment chamber significantly extends the field of use of the irradiation device. It is possible to irradiate aggressive or toxic substances, as well. In particular, deposits which form easily during photolytic processes can be removed once again from the walls of the treatment chamber by flushing a cleaning liquid, for example an acid, through the treatment chamber.

BRIEF DESCRIPTION OF THE DRAWINGS

A more complete appreciation of the invention and many of the attendant advantages thereof will be readily obtained as the same becomes better understood by reference to the following detailed description exemplary embodiments when considered in connection with the accompanying drawings, wherein.

DESCRIPTION OF THE PREFERRED EMBODIMENTS

Figure 1:
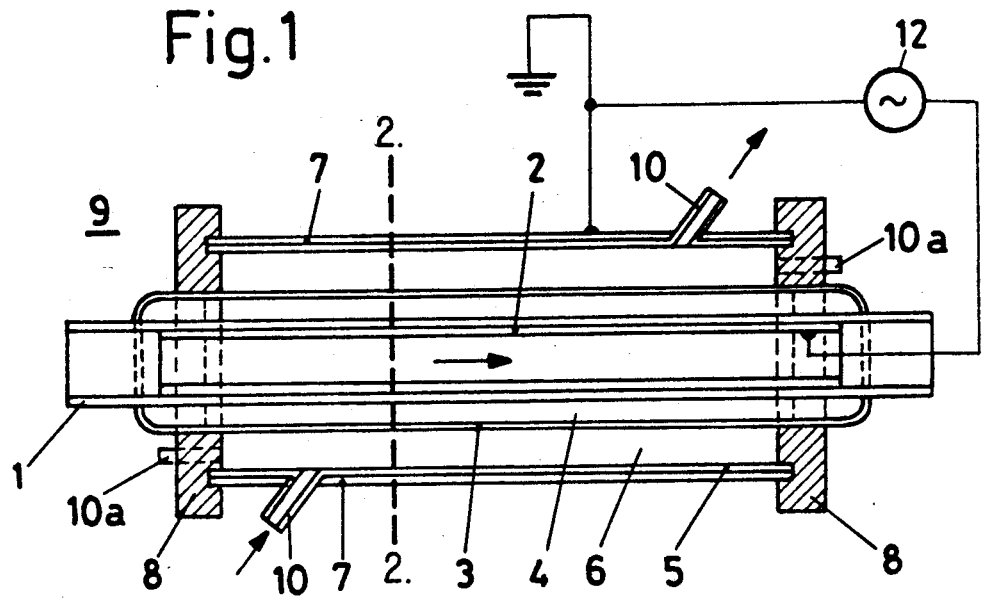
FIG. 1 shows a longitudinal section of a first exemplary embodiment of the invention in the form of a cylindrical irradiation device having an independent treatment chamber concentrically surrounding the irradiation chamber.
Figure 2:
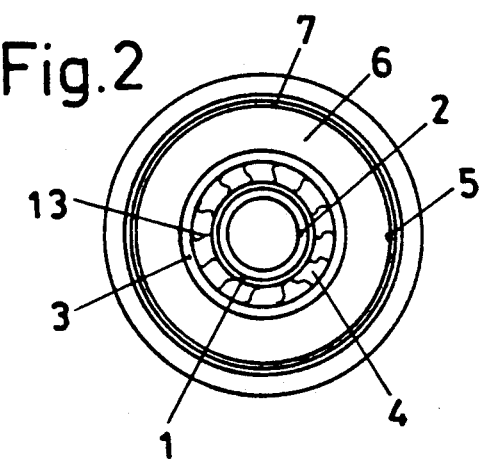
FIG. 2 shows a cross section through the irradiation device in accordance with FIG. 1 along its line AA.

Referring now to the drawings, wherein like reference numerals designate identical or corresponding parts throughout the several views, in FIGS. 1 and 2 the irradiation device comprises an internal dielectric tube 1, for example a glass or quartz tube 1, which is provided in the interior with a metal layer 2, preferably an aluminum layer. Said layer 2 forms the internal electrode of the radiator. The internal tube 1 is surrounded concentrically by, and at a distance from, a middle dielectric tube 3 which consists of a UV-transparent material, for example quartz. The space between the two tubes 1 and 3 forms the discharge chamber 4 of the radiator. The discharge chamber 4 is bounded towards the outside by an external tube 5 made from dielectric material, for example glass or quartz. The space between the tube 3 and the tube 5 forms the treatment chamber 6 of the irradiation device. A second metal layer 7, preferably made from aluminum, is applied to the external surface of the tube 6 and forms the external electrode of the radiator.

Whereas the two ends of the middle tube 3 are connected gastight to the internal tube 1, for example are fused together, the external tube 5 is held together with the coating 7 on both sides in a sealing washer 8. The latter consists of an elastomeric material or of another insulating material, for example PTFE (polytetrafluoroethylene), which separates the treatment chamber 6 gastight from the external chamber 9. Given the use of a less elastic material, gaskets (not illustrated) are then between. Two sockets 10 are provided in the external tube 5 for the supply and discharge of the medium to be treated. The supply and discharge can also be performed through the sealing washers 8 instead of via sockets 10 in the external tube 5. This results in a simplified design of the external tube 5. This variant is illustrated in FIG. 1 by sockets 10a, drawn in with dashes, in the two sealing washers 8. The design described enables the treatment chamber 6 to be separated simply from the discharge chamber 4 in order, for example, to carry out cleaning work or the like.

Figure 4:
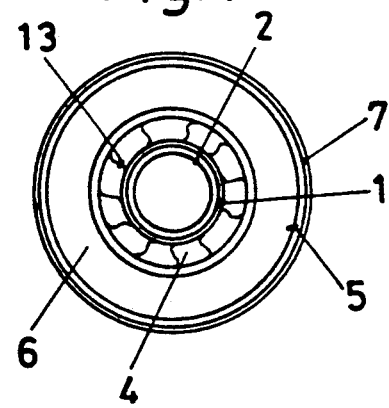
FIG. 4 shows a cross section through the irradiation device in accordance with FIG. 3 along its line BB.
Figure 3:
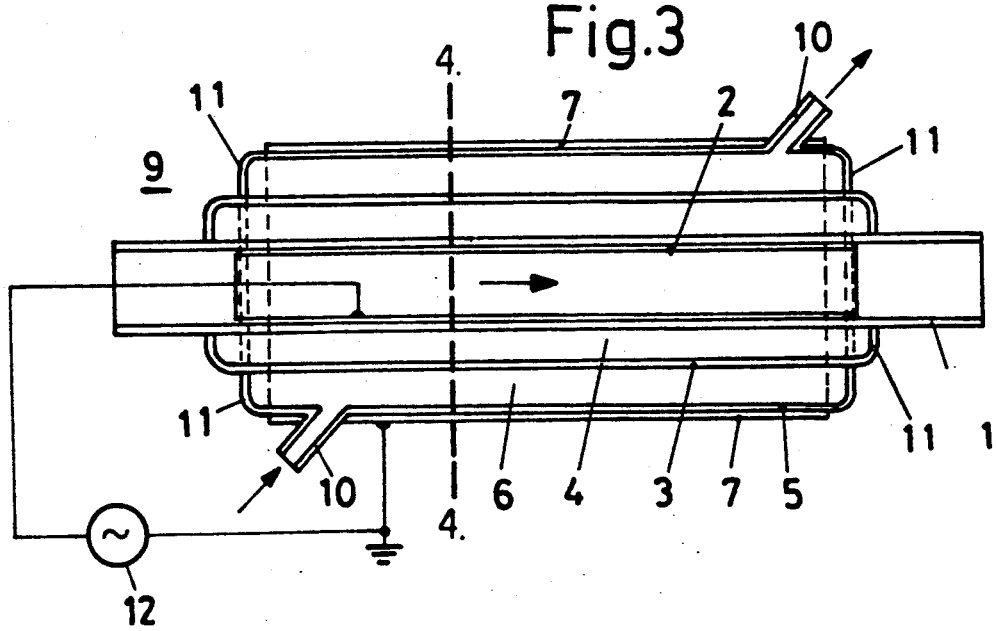
FIG. 3 shows a longitudinal section of a second exemplary embodiment of a cylindrical irradiation device having an external treatment chamber.

It can be advantageous when handling highly toxic gases to limit the number of seals to the absolute minimum. This is realized in FIGS. 3 and 4, for example, in that instead of the sealing washers 8 of the embodiment in accordance with FIGS. 1 and 2 respectively the ends 11 of the external tube 5 are drawn inwards and are connected gastight to the middle tube 3, for example are fused together. In such a design of the irradiation device, only sealing problems that are easy to grasp occur. Otherwise, the design corresponds to that of FIGS. 1 and 2, as demonstrated by the same reference numerals for the same parts. In both embodiments of the irradiation device, a cooling medium can be led through the interior of the internal tube 1. By contrast, it can be advantageous for the destruction of certain gaseous components not to (force-) cool the radiator, and this is eminently possible by means of the quartz apparatus in accordance with FIG. 3.

The feeding of the discharge in the discharge chamber 4 is performed by an ac source 12 of adjustable frequency and amplitude, which is connected to the two electrodes 2 and 7. The ac source 12 basically corresponds to those such as are used to feed ozone generators. Typically, it delivers an adjustable ac voltage of the order of magnitude of several 100 volts to 20,000 volts at frequencies in the range of industrial alternating current up to a few MHz—depending on the electrode geometry, pressure in the discharge chamber and composition of the filling gas.

The discharge chamber 4 between the tubes 1 and 3 is filled with a filling gas which emits radiation under discharge conditions and is, for example, mercury, noble gas, a mixture of noble gas and metal vapor or a mixture of noble gas and halogen, if necessary with the use of an additional further noble gas, preferably Ar, He, Ne, Xe as buffer gas.

Depending on the desired spectral composition of the radiation, a substance/mixture of substances in accordance with the following table can be used in this regard:

| Filling gas | Radiation |
|---|---|
| Helium | 60–100 nm |
| Neon | 80–90 nm |
| Argon | 107–165 nm |
| Argon + fluorine | 180–200 nm |
| Argon + chlorine | 165–190 nm |
| Argon + krypton + chlorine | 165–190 nm, 200–240 nm |
| Xenon | 120–190 nm |
| Nitrogen | 337–415 nm |
| Krypton | 124 nm, 140–160 nm |
| Krypton + fluorine | 240–255 nm |
| Krypton + SF$_6$ + Ar | 240 nm–255 nm |
| Krypton + chlorine | 200–240 nm |
| Mercury | 185 nm, 254 nm, 295–315nm, 365 nm, 366 nm |
| Selenium | 196, 204, 206 nm |
| Deuterium | 150–250 nm |
| Xenon + fluorine | 340–360 nm, 400–550 nm |
| Xenon + chlorine | 300–320 nm |

In addition, a whole series of further filling gases come into consideration:
  a noble gas (Ar, He, Kr, Ne, Xe) or Hg with a gas or vapor of F$_2$, I$_2$, Br$_2$, Cl$_2$ or a compound which splits off one or more atoms of F, I, Br or Cl in the discharge;
  a noble gas (Ar, He, Kr, Nr, Xe) or Hg with O$_2$ or a compound which splits off one or more O atoms in the discharge;
  a noble gas (Ar, He, Kr, Ne, Xe) with Hg.

When a voltage is applied between electrodes 2 and 7, a multiplicity of discharges 13 (illustrated only in FIGS. 2 and 4) is formed in the discharge chamber 4. The electron energy distribution in said discharge zone can be optimally adjusted by the thickness of the dielectric tube 1 or 3, the spacing of the tubes, pressure and/or temperature. The discharges radiate the UV light, which then penetrates through the UV-transparent tube 3 into the immediately adjoining treatment chamber 6.

The substance to be irradiated is led through the treatment chamber 6. Said substance can be gaseous or liquid. It is important in the case of liquid substances that they have a sufficiently high dielectric constant to be able to couple the energy from the external electrode 7 through the treatment chamber 6 into the discharge chamber 4.

Since the invention is preferably provided for irradiating watery substances, said condition is fulfilled in any case: as a consequence of its high dielectric constant only low electric field strengths prevail in water (or watery substances), so that the greatest part of the voltage applied between electrodes 2 and 7 occurs at the discharge chamber 4, that is to say between the dielectric tubes 1 and 3, and drives the discharge. The two electrodes 2 and 7 serve at the same time as a reflector for the UV radiation, because, as is known, aluminum layers reflect UV radiation effectively.

Instead of water or watery substances, it is also possible, of course, for any other liquid, emulsion or even a gas which fulfills the abovementioned preconditions to be irradiated. If a gas is used, it must merely be ensured that the ignition voltage in the discharge chamber 5 is smaller than that in the gas of the treatment chamber. This can always be achieved by appropriate selection of pressure and gap width, in particular in the discharge chamber:

In the non-ignited state, the described arrangement behaves like a capacitive voltage divider. The individual component voltages at the dielectrics and the gas gaps can be calculated using the capacitance formulae for cylindrical capacitors. It is to be borne in mind in this regard that quartz has a dielectric constant of $\epsilon = 3.7$, while $\epsilon = 1$ can be assumed with adequate accuracy for all gases. The preponderant component of the voltage is located at the gas sections, approximately equal electric field strengths being produced for the discharge chamber and the treatment chamber. Assuming, for example, air at a pressure of 1 bar in the treatment chamber of width 2 mm, an ignition field strength of just 40 kV/cm is produced in accordance with the known breakdown curves for air. If a xenon-excimer radiator is selected as UV source having a filling pressure below 0.3 bar and a discharge gap of width 5 mm, an ignition field strength of approximately 9 kV/cm is produced in the xenon. It is thus easy to find voltage ranges in which the gas discharge burns in the xenon without ignition of the air gap to be irradiated. On the other hand, in the irradiation of gases or gas mixtures quiet electric discharges can be forced in the treatment chamber 6 by increasing the ac voltage applied at the electrodes 2 and 7. Thus, the gas to be treated is additionally subjected to the action of high-energy electrons, ions and excited atoms or molecules. This combined effect of hard UV radiation and an electric discharge is suitable, in particular, for decomposing relatively poorly fissionable substances.

A range of modifications are possible without leaving the framework fixed by the invention:

Instead of tubes 1 or 5 made from dielectric material and coated with metal layers 2, 7, it is also possible to use metal tubes which are provided with a dielectric layer—outside in the case of the internal tube 1 and inside in the case of the external tube 5. In the case of the external tube 5 this layer must extend completely over the entire surface facing the treatment chamber 6, in order to ensure the "freedom from metal" of the treatment chamber 6.

The above discussions are related essentially exclusively to radiators having cylindrical geometries. The invention is not, of course, limited to such radiators. The teaching on which the invention is based can also be applied without any problem to configurations having plane dielectrics, preferably quartz plates.

Obviously, numerous modifications and variations of the present invention are possible in light of the above teachings. It is therefore to be understood that within the scope of the appended claims, the invention may be practiced otherwise than as specifically described herein.

What is claimed is new and desired to be secured by Letters Patent of the United States is:

1. An irradiation device having at least one high-power radiator with a discharge chamber filled with filling gas, the filling gas emitting radiation under the influence of quiet electrical discharges, the discharge chamber being bounded by walls of which at least one wall consists of dielectric material and is transparent to the radiation generated in the discharge chamber, a treatment chamber immediately adjoining one wall of the discharge chamber, having an electrode pair outside the discharge chamber, and having an ac source, connected to the two electrodes, for feeding the discharge, the coupling of the electrical energy into the discharge chamber being performed essentially capacitively by the substance to be treated in the treatment chamber, wherein the treatment chamber is sealed on all sides by walls made from non-metallic material or from material coated completely with non-metallic material.

2. The irradiation device as claimed in claim 1, wherein the filling gas is mercury, nitrogen, selenium, deuterium or a mixture of said substances alone or with a noble gas.

3. The irradiation device as claimed in claim 2, wherein the gas contains admixtures of sulfur, zinc, arsenic, selenium, cadmium, iodine or mercury.

4. The irradiation device as claimed in claim 1, wherein an internal tube made from dielectric material is provided on its inside with a first electrode, the internal tube is surrounded concentrically by a middle tube made from dielectric material and at a distance from the internal tube, and the middle tube is surrounded concentrically, for its part, by an external tube made from non-metallic material and at a distance from the middle tube, which external tube is provided outside with a second electrode.

5. The irradiation device as claimed in claim 4, wherein the two ends of the external tube are held gas-tight in a sealing washer, which sealing washer is pushed gastight onto the middle tube.

6. The irradiation device as claimed in one of claims 1 to 4, wherein the two ends of the external tube are drawn inwards and connected gastight to the middle tube, both the internal tube, the middle tube and the external tube consisting of quartz.

7. The irradiation device as claimed in one of claims 1 to 5, wherein the internal tube and/or the external tube consist of metal, it being the case that a layer made from dielectric material is completely provided for the internal tube on the side facing the discharge chamber and for the external tube on the side facing the treatment chamber.

8. The irradiation device as claimed in one of claims 1 to 5, wherein the ends of the middle tube are drawn inwards and are connected gastight to the internal tube.

* * * * *